United States Patent
Gao et al.

(10) Patent No.: US 11,582,018 B2
(45) Date of Patent: Feb. 14, 2023

(54) CLOCK DATA CALIBRATION CIRCUIT

(71) Applicant: Faraday Technology Corp., Hsinchu (TW)

(72) Inventors: Jing-Zhi Gao, Hsinchu (TW); Yu-Hsin Tseng, Hsinchu (TW); Yung-Sung Chang, Hsinchu (TW); Zhi-Xin Lin, Hsinchu (TW)

(73) Assignee: Faraday Technology Corp., Hsinchu (TW)

( * ) Notice: Subject to any disclaimer, the term of this patent is extended or adjusted under 35 U.S.C. 154(b) by 0 days.

(21) Appl. No.: 17/394,299

(22) Filed: Aug. 4, 2021

(65) Prior Publication Data
US 2022/0337385 A1 Oct. 20, 2022

(30) Foreign Application Priority Data

Apr. 15, 2021 (TW) .................................. 110113597

(51) Int. Cl.
*H04L 7/00* (2006.01)
(52) U.S. Cl.
CPC .......... *H04L 7/0016* (2013.01); *H04L 7/0079* (2013.01)
(58) Field of Classification Search
CPC .... H04L 7/0016; H04L 7/0079; H04L 7/0008
See application file for complete search history.

(56) References Cited

U.S. PATENT DOCUMENTS

| | | | | |
|---|---|---|---|---|
| 7,386,080 B2* | 6/2008 | Paillet | ................... | H04L 7/0079 375/355 |
| 8,098,692 B2 | 1/2012 | Albu et al. | | |
| 8,629,699 B2 | 1/2014 | Wachi et al. | | |
| 8,934,591 B2* | 1/2015 | Tai | ......................... | H04L 7/0338 375/354 |
| 2009/0256629 A1* | 10/2009 | Tseng | ..................... | H03L 7/091 329/304 |
| 2015/0207617 A1 | 7/2015 | Usuda | | |
| 2015/0333902 A1* | 11/2015 | Robertson | ............. | H04L 7/0016 375/371 |

FOREIGN PATENT DOCUMENTS

TW 201404105 1/2014

OTHER PUBLICATIONS

"Office Action of Taiwan Counterpart Application", dated Oct. 29, 2021, p. 1-p. 4.

* cited by examiner

*Primary Examiner* — Betsy Deppe
(74) *Attorney, Agent, or Firm* — JCIPRNET (57) ABSTRACT

A clock data calibration circuit including a first comparator, a multi-phase clock generator, a plurality of samplers, a plurality of data comparators and a data selector is provided. The first comparator compares first input data with second input data to generate a data signal. The multi-phase clock generator generates a plurality of clock signals, and the clock signals are divided into a plurality of clock groups. The sampler samples the data signal according to the clock groups to respectively generate a plurality of first sampled data signal groups. The data comparators respectively sample the first sampled data signal groups according to selected clocks to generate a plurality of second sampled data signal groups. Each data comparator generates a plurality of status flags according to a variation state of a plurality of second sampled data. The data selector generates a plurality of output data signals according to the status flags.

10 Claims, 11 Drawing Sheets

CLOCK DATA CALIBRATION CIRCUIT

CROSS-REFERENCE TO RELATED APPLICATION

This application claims the priority benefit of Taiwan application serial no. 110113597, filed on Apr. 15, 2021. The entirety of the above-mentioned patent application is hereby incorporated by reference herein and made a part of this specification.

BACKGROUND

Technical Field

The disclosure relates to a clock data calibration circuit, and particularly relates to a clock data calibration circuit capable of improving a skew tolerance between clock and data.

Description of Related Art

Low voltage differential signaling (LVDS) is a technique that may provide high-performance data transmission. In the related art, in order to resolve a problem of data error that may result from skew between clock signals and data signals, a clock data calibration circuit with a complicated structure is generally provided. Moreover, in the conventional clock data calibration circuit, it is generally necessary to set a reference data signal, provide a full-rate multi-phase clock, and execute a clock data calibration operation in a closed loop. Due to such requirements, the conventional clock data calibration circuit often requires relatively high power consumption, a relatively large circuit area, and has relatively low response speed. Therefore, how to improve the performance of the clock data calibration circuit has become an important issue.

SUMMARY

The invention is directed to a clock data calibration circuit, which is capable of improving a skew tolerance between clock and data.

The invention provides a clock data calibration circuit including a first comparator, a multi-phase clock generator, a plurality of samplers, a plurality of data comparators and a data selector. The first comparator compares first input data with second input data to generate a data signal. The multi-phase clock generator compares a first input clock and a second input clock to generate a plurality of clock signals with different phases, and the clock signals are divided into a plurality of clock groups. The samplers sample the data signal according to the clock groups to respectively generate a plurality of first sampled data signal groups. The data comparators respectively sample the first sampled data signal groups according to a plurality of selected clocks in the clock signals to respectively generate a plurality of second sampled data signal groups. Each of the data comparators generates a plurality of status flags according to a variation state of a plurality of second sampled data of each of the second sampled data signal groups. The data selector selects the second sampled data according to the status flags to generate a plurality of output data signals.

Based on the above description, the clock data calibration circuit of the invention uses additional data sampling to perform data comparison, and finds out the sampled data corresponding to the better clock signal by finding consecutive sampled data. The clock data calibration circuit of the invention does not need to apply a complicated circuit structure, does not need to receive reference data, does not need to apply a closed loop structure, and does not need a full-rate multi-phase clock signal, which effectively reduces power consumption and circuit area, and improves system performance.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
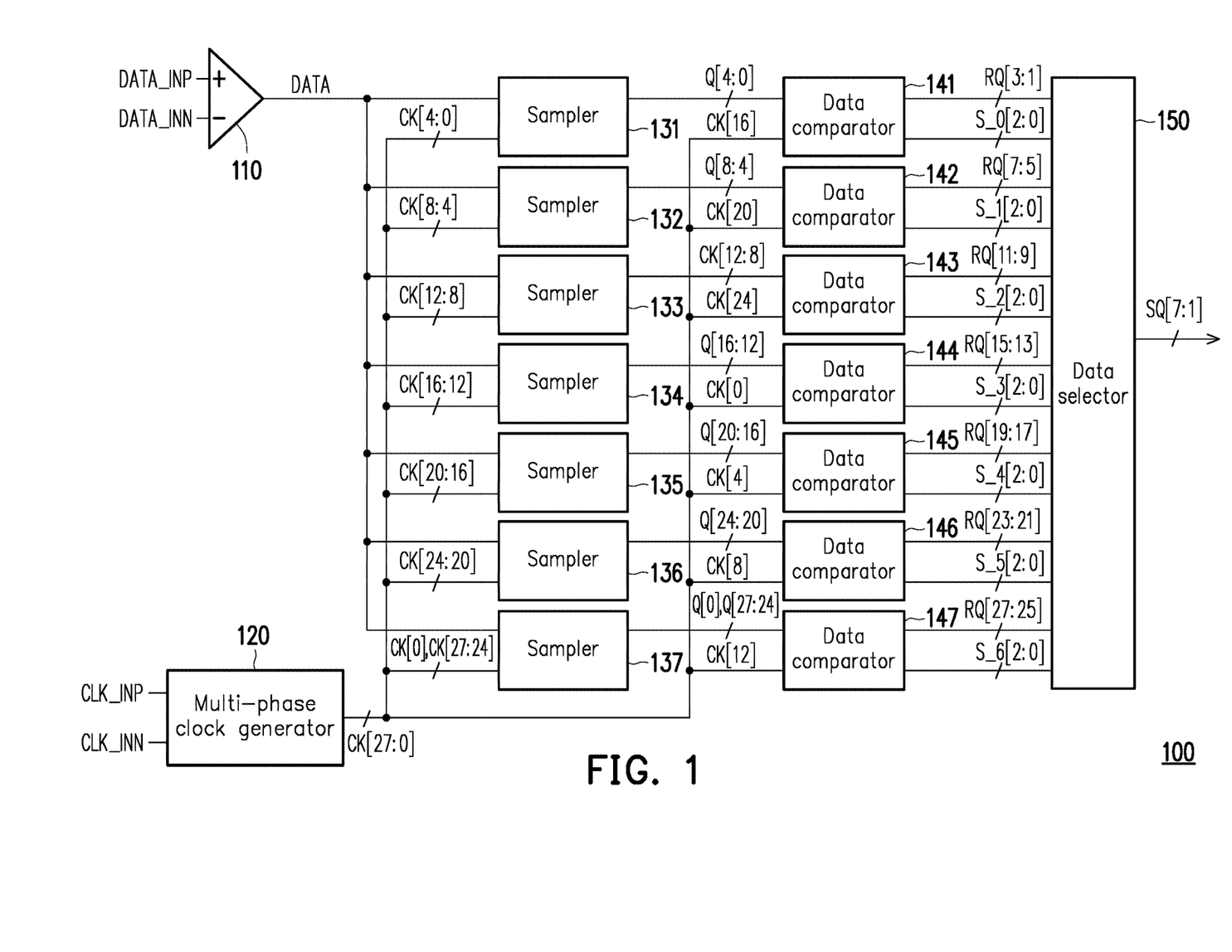
FIG. 1 is a schematic diagram of a clock data calibration circuit according to an embodiment of the invention.

Referring to FIG. 1, FIG. 1 is a schematic diagram of a clock data calibration circuit according to an embodiment of the invention. A clock data calibration circuit 100 includes a comparator 110, a multi-phase clock generator 120, samplers 131-137, data comparators 141-147, and a data selector 150. The comparator 110 generates a data signal DATA by comparing input data DATA_INP and input data DATA_INN. The input data DATA_INP and the input data DATA_INN may be differential signals. The comparator 110 may be implemented by an operational amplifier, and a positive input terminal of the operational amplifier may be used to receive the input data DATA_INP, and a negative input terminal of the operational amplifier may be used to receive the input data DATA_INN. An output terminal of the operational amplifier generates the data signal DATA.

The multi-phase clock generator 120 receives an input clock CLK_INP and an input clock CLK_INN, where the input clock CLK_INP and the input clock CLK_INN respectively correspond to the input data DATA_INP and the input data DATA_INN. The multi-phase clock generator 120 compares the input clock CLK_INP and the input clock CLK_INN to generate a plurality of clock signals CK[27:0] with different phases.

In the embodiment, the clock signals CK[27:0] may be divided into a plurality of clock groups. Where, the clock signals CK[4:0] may be a first clock group, the clock signals CK[8:4] may be a second clock group, and the others may be deduced by analogy, and the clock signals CK[27:24] and CK[0] may be divided into a seventh clock group.

The samplers 131-137 respectively correspond to the above seven clock groups. The samplers 131-137 respectively receive the above seven clock groups, and commonly receive the data signal DATA. The samplers 131-137 respectively sample the data signal DATA according to the above clock groups to generate a plurality of first sampled data signals Q[27:0], where the first sampled data signals Q[27:0] may be divided into a plurality of sampled data signal groups. The sampled data signal group generated by the sampler 131 include first sampled data Q[4:0], the first sampled data Q[4:0] respectively correspond to the clock signals CK[4:0], and the sampled data signal group generated by the sampler 132 includes first sampled data Q[8:4], and the first sampled data Q[8:4] respectively correspond to the clock signals CK[8:4]. The others may be deduced by analogy. The sampled data signal groups generated by the sampler 137 may include first sampled data Q[0] and Q[27:24], and the first sampled data Q[0] and Q[27:24] respectively correspond to the clock signals CK[0] and CK[27:24].

The data comparators 141-147 respectively correspond to the samplers 131-137. The data comparators 141-147 respectively receive the sampled data signal groups generated by the samplers 131-137. Each of the data comparators 141-147 additionally receives a selected clock signal of one of the clock signals CK[27:0]. The data comparators 141-147 respectively sample the corresponding sampled data signal groups according to the received selected clock signals, and generate a plurality of second sampled data signal groups. The second sampled data signal groups include a plurality of second sampled data.

In addition, each of the data comparators 141-147 generates a plurality of status flags S_0[2:1]-S_6[2:1] according to a variation state of a plurality of second sampled data of the second sampled data signal groups. The data comparators 141-147 respectively output a part of second sampled data RQ[3:1]-RQ[27:25] and the status flags S_0[2:1]-S_6[2:1].

The data selector 150 is coupled to the data comparators 141-147, and receives the second sampled data RQ[3:1]-RQ[27:25] and the status flags S_0[2:1]-S_6[2:1]. The data selector 150 selects the second sampled data RQ[3:1]-RQ[27:25] according to the status flags S_0[2:1]-S_6[2:1] to generate a plurality of output data signals SQ[7:1].

It should be noted that the numbers of the samplers 131-137, data comparators 141-147, the first sampled data signals Q[27:0], the status flags S_0[2:1]-S_6[2:1], the clock signals CK[27:0] and the second sampled data RQ[3:1]-RQ[27:25] shown in FIG. 1 are only an example. Those with ordinary knowledge in the art may change the numbers of the aforementioned components and signals according to actual requirements based on the embodiment shown in FIG. 1, which are not fixedly limited.

Figure 2:
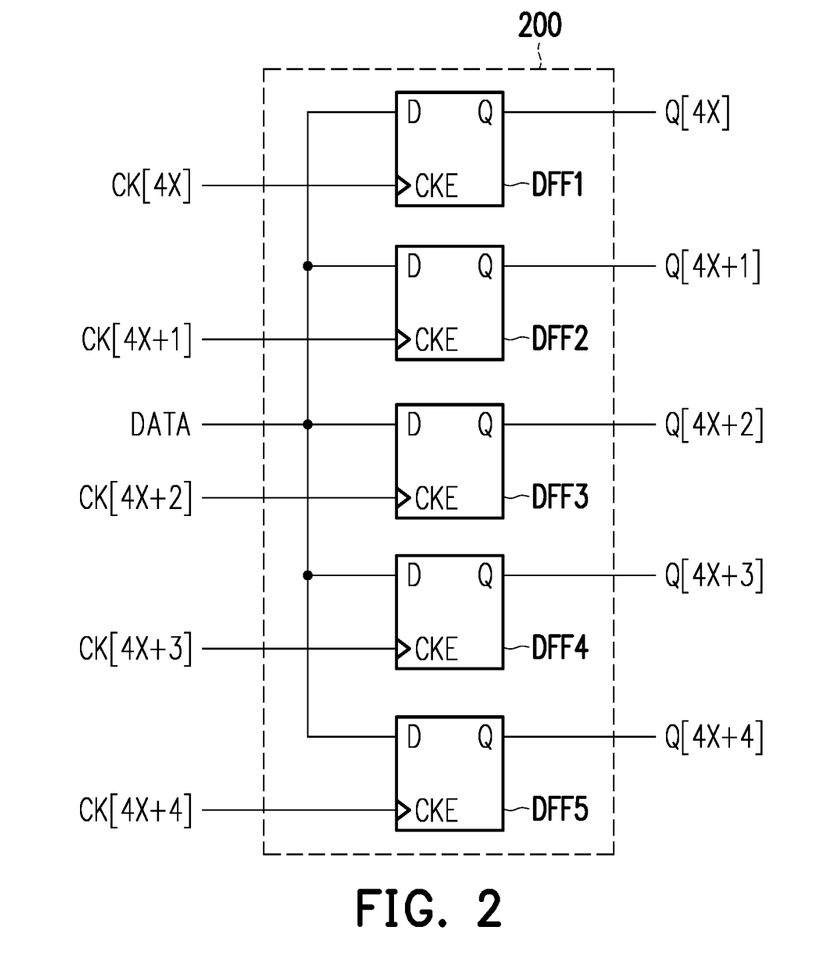
FIG. 2 is a schematic diagram of an implementation of a sampler in a clock data calibration circuit according to an embodiment of the invention.

Referring to FIG. 2, FIG. 2 is a schematic diagram of an implementation of a sampler in a clock data calibration circuit according to an embodiment of the invention. A sampler 200 includes a plurality of flip-flops DFF1-DFF5. The sampler 200 of the embodiment may be an X-th stage sampler in the samplers 131-137 of the embodiment of FIG. 1, where X is an integer not less than 0. Each of the flip-flop DFF1-DFF5 has a data terminal D, a clock terminal CKE, and an output terminal O. The data terminals D of the flip-flops DFF1-DFF5 commonly receive the data signal DATA; the clock terminals CKE of the flip-flops DFF1-DFF5 respectively receive clock signals CK[4X]-CK[4X+4], where the clock signals CK[4X]-CK[4X+4] belong to a same clock group; the output terminals O of the flip-flops DFF1-DFF5 respectively generate first sampled data signals Q[4X]-Q[4X+4], and the first sampled data signals Q[4X]-Q[4X+4] belongs to a same sampled data signal group.

Figure 3:
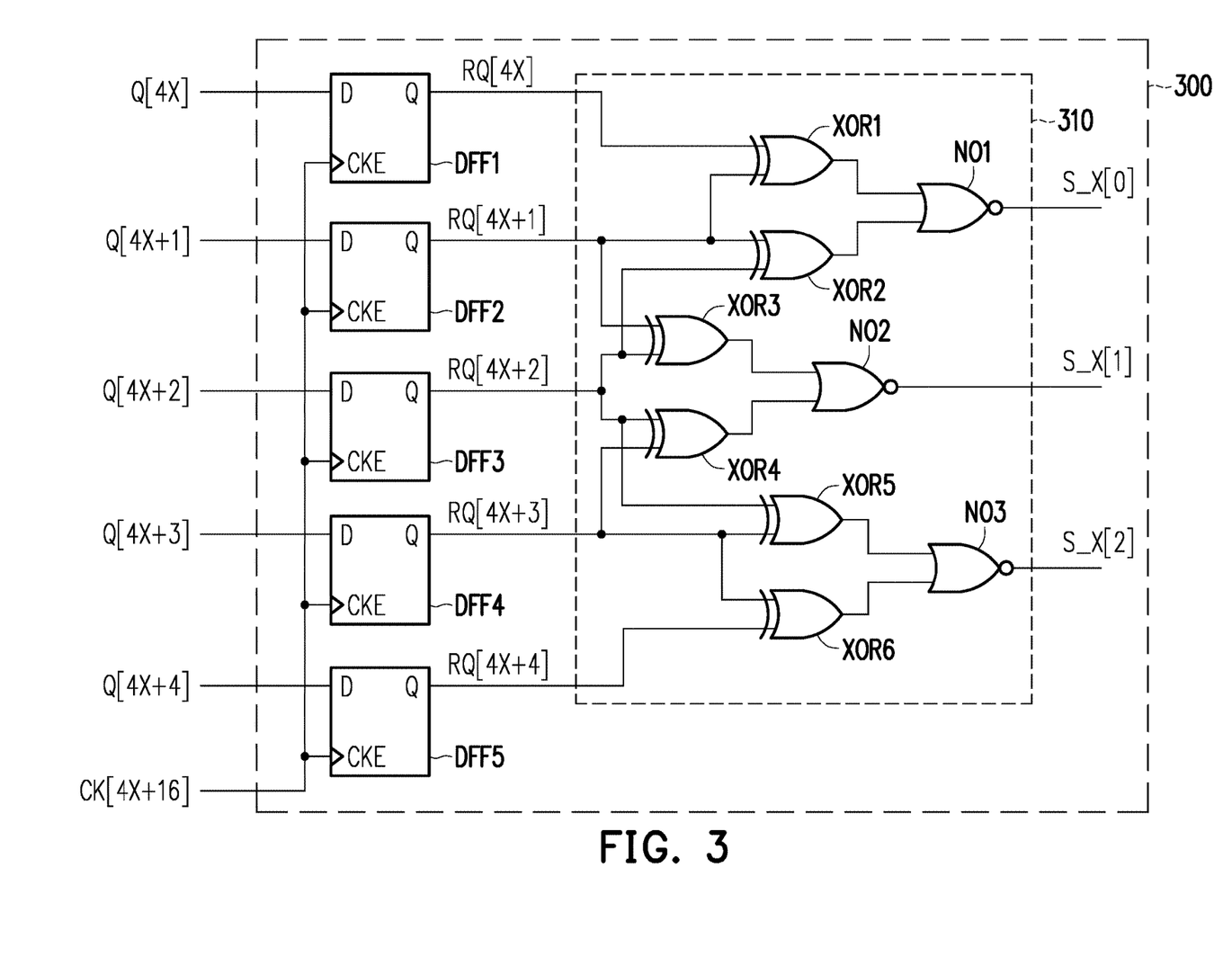
FIG. 3 is a schematic diagram of an implementation of a data comparator in a clock data calibration circuit according to an embodiment of the invention.

Referring to FIG. 3, FIG. 3 is a schematic diagram of an implementation of a data comparator in a clock data calibration circuit according to an embodiment of the invention. A data comparator 300 includes a plurality of flip-flops DFF1-DFF5 and a logic circuit 310. The data comparator 300 of the embodiment may be an X-th stage data comparator in the data comparators 141-147 of the embodiment of FIG. 1, where X is an integer not less than 0. Each of the flip-flops DFF1-DFF5 has a data terminal D, a clock terminal CK, and an output terminal O. The data terminals D of the flip-flops DFF1-DFF5 respectively receive the first sampled data signals Q[4X]-Q[4X+4]; the clock terminals CKE of the flip-flops DFF1-DFF5 commonly receive the clock signal CK[4X+16]; and the output terminals O of the flip-flops DFF1-DFF5 respectively generate the second sampled data RQ[4X]-RQ[4X+4].

In the embodiment, the clock signal CK[4X+16] commonly received by the clock terminals CKE of the flip-flops DFF1-DFF5 is a selected clock signal selected from the plurality of clock signals provided by the multi-phase clock generator. Corresponding to the received first sampled data signal Q[4X]-Q[4X+4], the selected clock signal may be set as a clock signal that generates a sampling point (transition) at about ½ cycle of the first sampled data signals Q[4X]-Q[4X+4].

When an index value 4X+16 in the clock signal CK[4X+16] is greater than or equal to a maximum index value, the index value 4X+16 may be subtracted by the maximum index value and then subtracted by 1 to generate a new index value. For example, if the maximum index value is 27, when X=3, 4X+16=28>27. Therefore, 28-27-1 is required to generate the new index value=0.

On the other hand, the second sampled data RQ[4X]-RQ[4X+4] are sent to the logic circuit 310. The logic circuit 310 is used to calculate variation states of three consecutive second sampled data in the second sampled data RQ[4X]-RQ[4X+4] to generate status flags S_X[0]-S_X[2] accordingly. In the embodiment, the logic circuit 310 respectively calculates the variation state of the second sampled data RQ[4X]-RQ[4X+2], the variation state of the second sampled data RQ[4X+1]-RQ[4X+3] and the variation state of the second sampled data RQ[4X+2]-RQ[4X+4], and respectively generates the status flags S_X[0]-S_X[2]. Where, a relationship between the second sampled data RQ[4X]-RQ[4X+4] and the status flags S_X[0]-S_X[2] is shown in following Table 1:

TABLE 1

| RQ[4X] | RQ[4X + 1] | RQ[4X + 2] | RQ[4X + 3] | RQ[4X + 4] | S_X[0] | S_X[1] | S_X[2] |
|---|---|---|---|---|---|---|---|
| 0 | 0 | 0 | 0 | 0 | 1 | 1 | 1 |
| 0 | 0 | 0 | 0 | 1 | 1 | 1 | 0 |
| 0 | 0 | 0 | 1 | 0 | 1 | 0 | 0 |
| 0 | 0 | 0 | 1 | 1 | 1 | 0 | 0 |
| 0 | 0 | 1 | 0 | 0 | 0 | 0 | 0 |
| 0 | 0 | 1 | 0 | 1 | 0 | 0 | 0 |
| 0 | 0 | 1 | 1 | 0 | 0 | 0 | 0 |
| 0 | 0 | 1 | 1 | 1 | 0 | 0 | 1 |
| 0 | 1 | 0 | 0 | 0 | 0 | 0 | 1 |
| 0 | 1 | 0 | 0 | 1 | 0 | 0 | 0 |
| 0 | 1 | 0 | 1 | 0 | 0 | 0 | 0 |
| 0 | 1 | 0 | 1 | 1 | 0 | 0 | 0 |
| 0 | 1 | 1 | 0 | 0 | 0 | 0 | 0 |
| 0 | 1 | 1 | 0 | 1 | 0 | 0 | 0 |
| 0 | 1 | 1 | 1 | 0 | 0 | 1 | 0 |
| 0 | 1 | 1 | 1 | 1 | 0 | 1 | 1 |
| 1 | 0 | 0 | 0 | 0 | 0 | 1 | 1 |
| 1 | 0 | 0 | 0 | 1 | 0 | 1 | 0 |
| 1 | 0 | 0 | 1 | 0 | 0 | 0 | 0 |
| 1 | 0 | 0 | 1 | 1 | 0 | 0 | 0 |
| 1 | 0 | 1 | 0 | 0 | 0 | 0 | 0 |
| 1 | 0 | 1 | 0 | 1 | 0 | 0 | 0 |
| 1 | 0 | 1 | 1 | 0 | 0 | 0 | 0 |
| 1 | 0 | 1 | 1 | 1 | 0 | 0 | 1 |
| 1 | 1 | 0 | 0 | 0 | 0 | 0 | 1 |
| 1 | 1 | 0 | 0 | 1 | 0 | 0 | 0 |
| 1 | 1 | 0 | 1 | 0 | 0 | 0 | 0 |
| 1 | 1 | 0 | 1 | 1 | 0 | 0 | 0 |
| 1 | 1 | 1 | 0 | 0 | 1 | 0 | 0 |
| 1 | 1 | 1 | 0 | 1 | 1 | 0 | 0 |
| 1 | 1 | 1 | 1 | 0 | 1 | 1 | 0 |
| 1 | 1 | 1 | 1 | 1 | 1 | 1 | 1 |

In above Table 1, the status flag S_X[0] is generated based on the variation state of the second sampled data RQ[4X], RQ[4X+1], RQ[4X+2]. Where, when the second sampled data RQ[4X], RQ[4X+1], RQ[4X+2] are all equal, the status flag S_X[0] is equal to logic 1, and when the second sampled data RQ[4X], RQ[4X+1] and RQ[4X+2] are not equal, the status flag S_X[0] is equal to logic 0. The status flag S_X[1] is generated based on the variation state of the second sampled data RQ[4X+1], RQ[4X+2], RQ[4X+3]. When the second sampled data RQ[4X+1], RQ[4X+2], RQ[4X+3] are all equal, the status flag S_X[1] is equal to logic 1, and when the second sampled data RQ[4X+1], RQ[4X+2] and RQ[4X+3] are not equal, the status flag S_X[1] is equal to logic 0. The status flag S_X[2] is generated based on the variation state of the second sampled data RQ[4X+2], RQ[4X+3], RQ[4X+4]. When the second sampled data RQ[4X+2], RQ[4X+3], RQ[4X+4] are all equal, the status flag S_X[2] is equal to logic 1, and when the second sampled data RQ[4X+2], RQ[4X+3] and RQ[4X+4] are not equal, the status flag S_X[2] is equal to logic 0.

In view of a hardware architecture, the logic circuit 310 includes XOR gates XOR1-XOR6 and NOR gates NO1-NO3. The XOR gate XOR1 compares the second sampled data RQ[4X], RQ[4X+1], the XOR gate XOR2 compares the second sampled data RQ[4X+1], RQ[4X+2], and the NOR gate NO1 generates the status flag S[0] equal to logic 0 when the second sampled data RQ[4X] is different from the second sampled data RQ[4X+1] and/or the second sampled data RQ[4X+1] is different from the second sampled data RQ[4X+2]. Comparatively, when the second sampled data RQ[4X]-RQ[4X+2] are all the same, the NOR gate NO1 generates the status flag S[0] equal to logic 1. In addition, the XOR gate XOR3 compares the second sampled data RQ[4X+1], RQ[4X+2], the XOR gate XOR4 compares the second sampled data RQ[4X+2], RQ[4X+3], and the NOR gate NO2 generates the status flag S[1] equal to logic 0 when the second sampled data RQ[4X+1] is different from the second sampled data RQ[4X+2] and/or the second sampled data RQ[4X+2] is different from the second sampled data RQ[4X+3]. Comparatively, when the second sampled data RQ[4X+1]-RQ[4X+3] are all the same, the NOR gate NO2 generates the status flag S[1] equal to logic 1. The XOR gate XOR5 compares the second sampled data RQ[4X+2], RQ[4X+3], the XOR gate XOR6 compares the second sampled data RQ[4X+3], RQ[4X+4], and the NOR gate NO3 generates the status flag S[2] equal to logic 0 when the second sampled data RQ[4X+2] is different from the second sampled data RQ[4X+3] and/or the second sampled data RQ[4X+3] is different from the second sampled data RQ[4X+4]. Comparatively, when the second sampled data RQ[4X+2]-RQ[4X+4] are all the same, the NOR gate NO3 generates the status flag S[2] equal to logic 1.

Figure 4A:
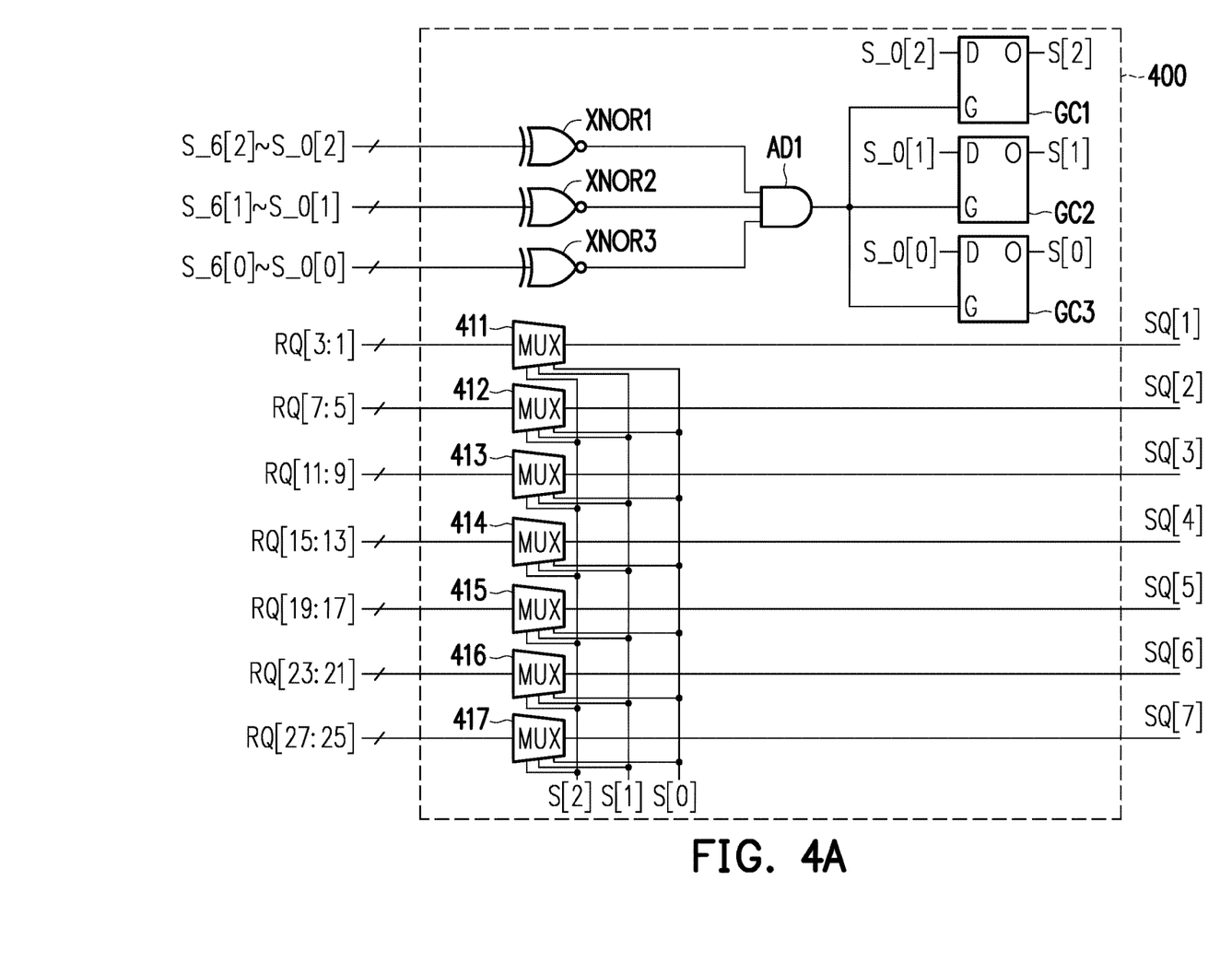
FIG. 4A is a schematic diagram of an implementation of a data selector in a clock data calibration circuit according to an embodiment of the invention.
Figure 4B:
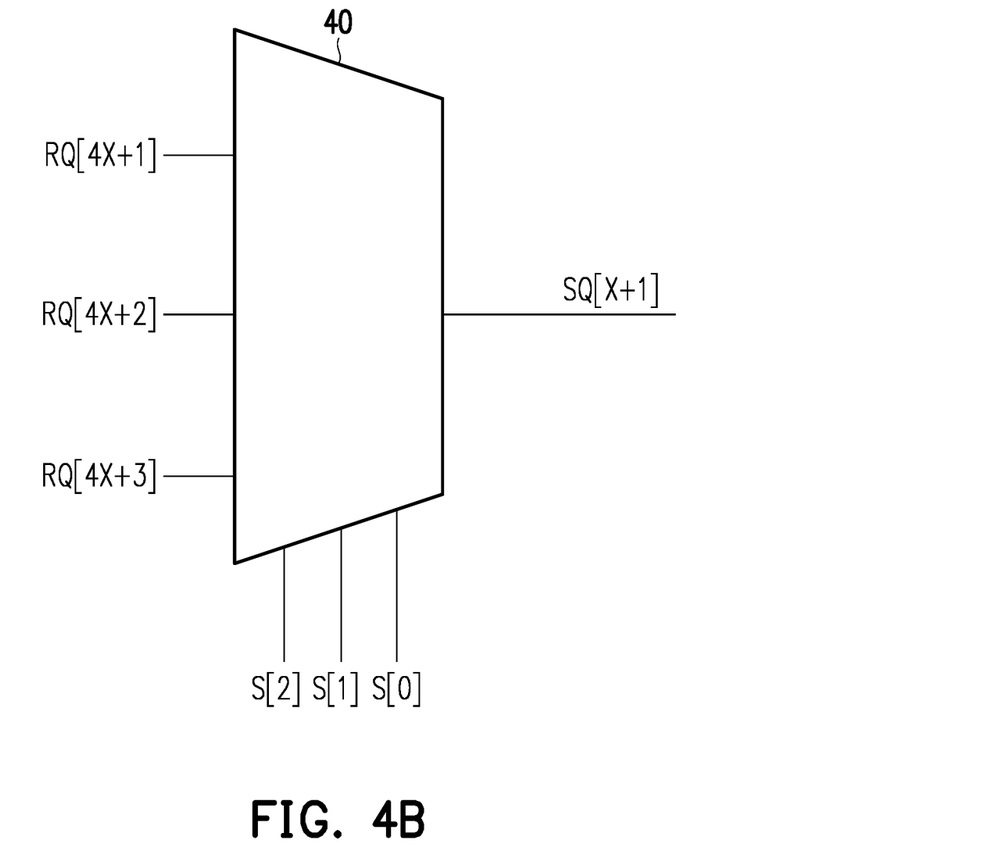
FIG. 4B illustrates implementation details of a multiplexer in the data selector according to an embodiment of the invention.

Referring to FIGS. 4A and 4B, where FIG. 4A is a schematic diagram of an implementation of a data selector in a clock data calibration circuit according to an embodiment of the invention, and FIG. 4B illustrates implementation details of a multiplexer in the data selector according to an embodiment of the invention. A data selector 400 includes a plurality of logic gates XNOR1-XNOR3, AD1, a plurality of gate controllers GC1-GC3, and a plurality of multiplexers 411-417. In the embodiment, the logic gates XNOR1-XNOR3 are XNOR gates, and the logic gate AD1 is an AND gate. The logic gate XNOR1 receives status flags S_6[2]-S_0[2]; The logic gate XNOR2 receives status flags S_6[1]-S_0[1]; and the logic gate XNOR3 receives status flags S_6[0]-S_0[0].

The logic gates XNOR1-XNOR3 are used to compare similarities and differences between the status flags S_6[2]-S_0[2], S_6[1]-S_0[1], and S_6[0]-S_0[0]. When S_6[2]-S_0[2] are the same to each other, S_6[1]-S_0[1] are the same to each other, and S_6[0]-S_0[0] are the same to each other, the logic gate AD1 may generate an output equal to logic 1 to the gate controller GC1-GC3.

Each of the gate controllers GC1-GC3 has a data terminal D, an output terminal O, and a control terminal G. The data terminals D of the gate controllers GC1-GC3 respectively receive the status flags S_0[2], S_0[1], S_0[0]. When the output of the logic gate AD1 is equal to logic 1, the output terminals Q of the gate controllers GC1-GC3 generate selection signals S[2], S[1], S[0] respectively equal to the status flags S_0[2], S_0[1], S_0[0].

In the embodiment, the status flags S_0[0]-S_6[0] respectively correspond to the data comparators 141-147 shown in FIG. 1; the status flags S_0[1]-S_6[1] respectively correspond to the data comparators 141-147 shown in FIG. 1; and the status flags S_0[2]-S_6[2] also respectively correspond to the data comparators 141-147 shown in FIG. 1.

The selection signals S[2], S[1], S[0] are transmitted to the multiplexers 411-417. The multiplexers 411-417 receive the second sampled data RQ[3:1], RQ[7:5], RQ[11:9], RQ[15:13], RQ[19:17], RQ[23:21], RQ[27:25] respectively generated by the data comparators 141-147 shown in FIG. 1, and respectively generate a plurality of output data signals SQ[1]-SQ[7] commonly according to the selection signals S[2], S[1], S[0].

Referring to FIG. 4B, in FIG. 4B, a multiplexer 40 corresponds to an X-th stage data comparator, and receives the second sampled data RQ[4X+1], RQ[4X+2], and RQ[4X+3]. The multiplexer 40 selects one of the second sampled data RQ[4X+1], RQ[4X+2], and RQ[4X+3] according to the selection signals S[0], S[1], S[2] to generate an output signal SQ[X+1]. A truth table of the multiplexer 40 may be as shown in following Table 2:

TABLE 2

| S[2] | S[1] | S[0] | SQ[X + 1] |
|------|------|------|-----------|
| 0 | 0 | 0 | RQ[4X + 2] |
| 0 | 0 | 1 | RQ[4X + 1] |
| 0 | 1 | 0 | RQ[4X + 2] |
| 0 | 1 | 1 | RQ[4X + 2] |
| 1 | 0 | 0 | RQ[4X + 3] |
| 1 | 0 | 1 | RQ[4X + 2] |
| 1 | 1 | 0 | RQ[4X + 2] |
| 1 | 1 | 1 | RQ[4X + 2] |

Figure 5A:
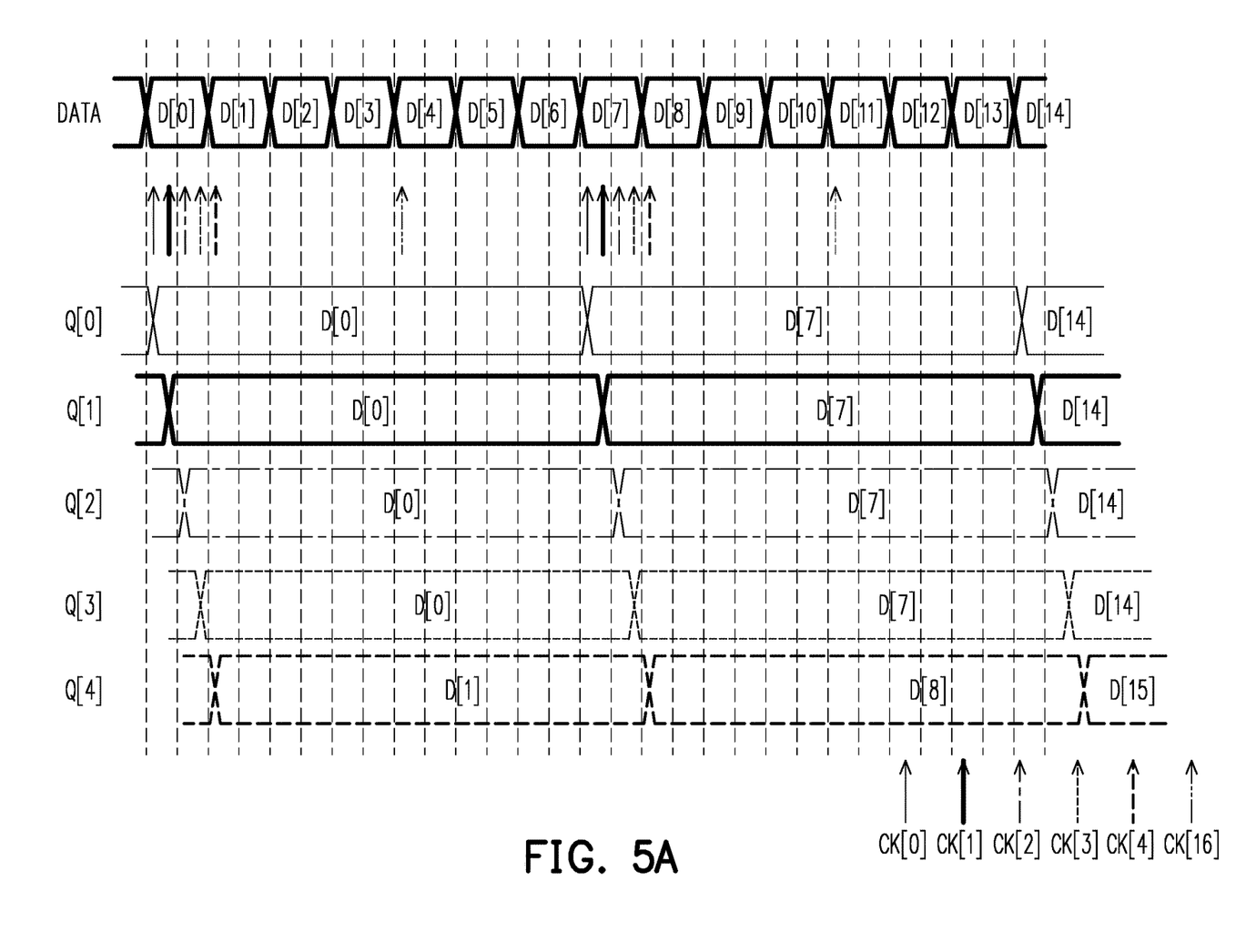
FIGS. 5A and 5B illustrate operation waveform diagrams of a clock data calibration circuit when phases of clock signals lag behind according to an embodiment of the invention.
Figure 5B:
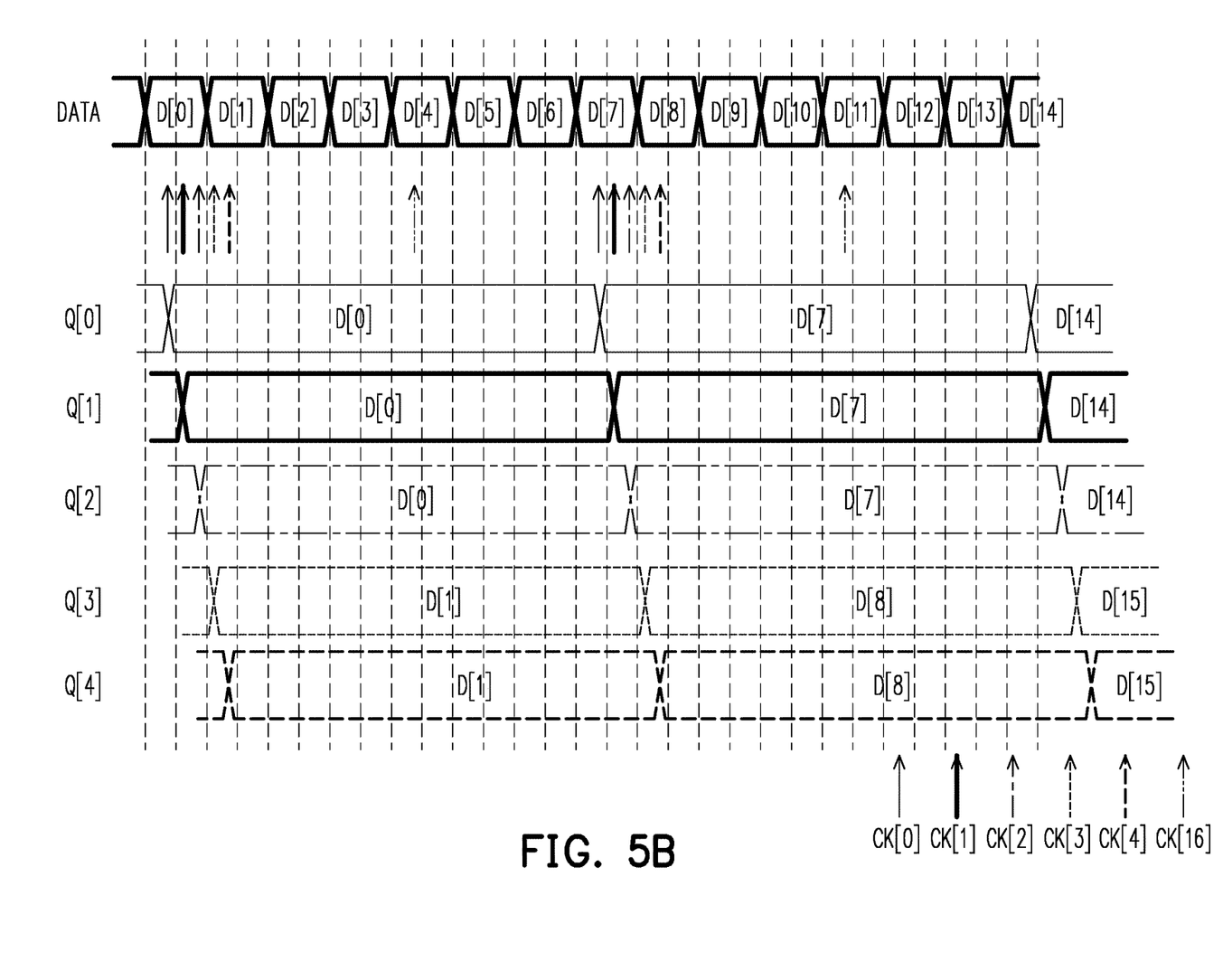

Referring to FIGS. 5A and 5B, FIGS. 5A and 5B illustrate operation waveform diagrams of the clock data calibration circuit when phases of the clock signals lag behind according to an embodiment of the invention. In FIG. 5A, the first sampled data Q[0], Q[1], Q[2], Q[3] and Q[4] obtained by respectively sampling according to the clock signals CK[0]-CK[4] may be as shown in FIG. 5A. When the phases of the clock signals lag behind the data signal by 0-0.25 unit intervals (UI), and when data D[7] and D[8] in the data signal DATA are the same, the first sampled data Q[0], Q[1], Q[2], Q[3] and Q[4] (i.e., the second sampled data RQ[0], RQ[1], RQ[2], RQ[3] and RQ[4]) obtained by sampling the data signal DATA according to a second sampling point of the clock signal CK[16] are respectively data D[7], D[7], D[7], D[7] and D[8], which may all be logic 1 or logic 0. Under such condition, according to the variation state of the second sampled data, the status flags S[2], S[1], S[0] generated by the data comparators of the embodiment of the invention may be respectively logic 1, 1, and 1. Further, the data selector may select the first sampled data Q[2] located in the middle (equal to the second sampled data RQ[2]) as an output data signal according to the status flags S[2], S[1], S[0] equal to logic 1, 1, 1 with reference of Table 2.

Based on the above description, when the data D[7] and D[8] in the data signal DATA are not the same, the first sampled data Q[0], Q[1], Q[2], Q[3] and Q[4] (i.e., the second sampled data RQ[0], RQ[1], RQ[2], RQ[3] and RQ[4]) obtained by sampling the data signal DATA according to the second sampling point of the clock signal CK[16] are respectively data D[7], D[7], D[7], D[7] and D[8], which may be logic 0,0,0,0,1 or logic 1,1,1,1,0. Under such condition, according to the variation state of the second sampled data, the status flags S[2], S[1], S[0] generated by the data comparators of the embodiment of the invention may be respectively logic 0, 1, 1. Further, the data selector may select the first sampled data Q[2] (equal to the second sampled data RQ[2]) as an output data signal according to the status flags S[2], S[1], S[0] equal to logic 0, 1, 1 with reference of Table 2.

In the embodiment of FIG. 5A, when the data D[7] and D[8] are the same, the selected output data signal (the first sampled data Q[2]) may satisfy a setup time greater than 0.5 UI, and has a hold time greater than 1.25 UI. When the data D[7] and D[8] are not the same, the selected output data signal (the first sampled data Q[2]) may satisfy the setup time greater than 0.5 UI and has the hold time greater than 0.25 UI.

In FIG. 5B, the first sampled data Q[0], Q[1], Q[2], Q[3] and Q[4] obtained by respectively sampling according to the clock signals CK[0]-CK[4] may be as shown in FIG. 5B. When the phases of the clock signals lag behind the data signal by 0.25-0.5 UI, and when the data D[7] and D[8] in the data signal DATA are the same, the first sampled data Q[0], Q[1], Q[2], Q[3] and Q[4] (i.e., the second sampled data RQ[0], RQ[1], RQ[2], RQ[3] and RQ[4]) obtained by sampling the data signal DATA according to the second sampling point of the clock signal CK[16] are respectively data D[7], D[7], D[7], D[8] and D[8], which may all be logic 1 or logic 0. Under such condition, according to the variation state of the second sampled data, the status flags S[2], S[1], S[0] generated by the data comparators of the embodiment of the invention may be respectively logic 1, 1, and 1. Further, the data selector may select the first sampled data Q[2] located in the middle (equal to the second sampled data RQ[2]) as an output data signal according to the status flags S[2], S[1], S[0] equal to logic 1, 1, 1 with reference of Table 2.

Based on the above description, when the data D[7] and D[8] in the data signal DATA are not the same, the first sampled data Q[0], Q[1], Q[2], Q[3] and Q[4] (i.e., the second sampled data RQ[0], RQ[1], RQ[2], RQ[3] and RQ[4]) obtained by sampling the data signal DATA according to the second sampling point of the clock signal CK[16] are respectively data D[7], D[7], D[7], D[8] and D[8], which may be logic 0,0,0,1,1 or logic 1,1,1,0,0. Under such condition, according to the variation state of the second sampled data, the status flags S[2], S[1], S[0] generated by the data comparators of the embodiment of the invention may be respectively logic 0, 0, 1. Further, the data selector may select the first sampled data Q[1] (equal to the second sampled data RQ[1]) as an output data signal according to the status flags S[2], S[1], S[0] equal to logic 0, 0, 1 with reference of Table 2.

In the embodiment of FIG. 5B, when the data D[7] and D[8] are the same, the selected output data signal (the first sampled data Q[2]) may satisfy a setup time greater than 0.75 UI, and has a hold time greater than 1.0 UI. When the data D[7] and D[8] are not the same, the selected output data signal (the first sampled data Q[2]) may satisfy the setup time greater than 0.5 UI and has the hold time greater than 0.25 UI.

Figure 6A:
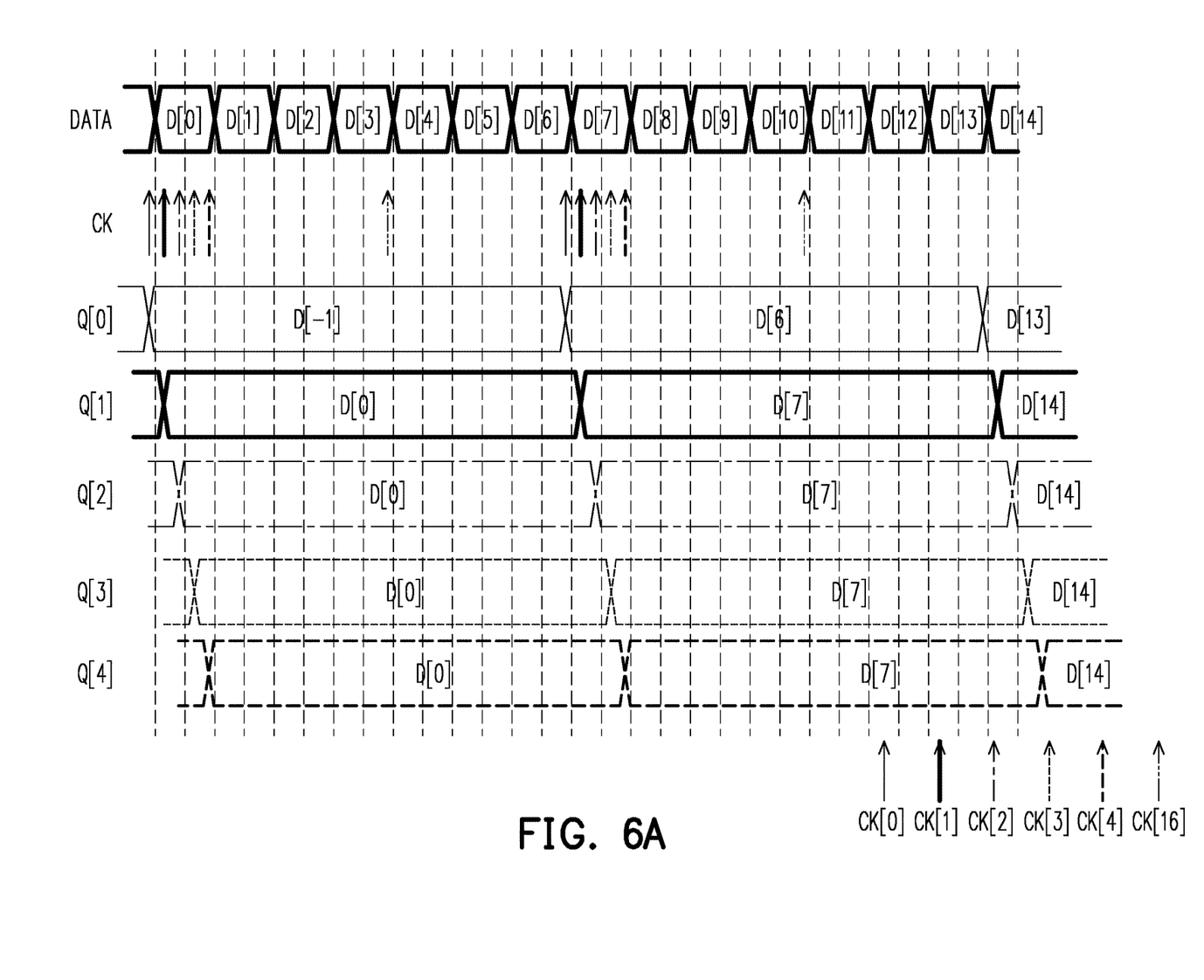
FIGS. 6A and 6B illustrate operation waveform diagrams of a clock data calibration circuit when phases of clock signals pull ahead according to an embodiment of the invention.
Figure 6B:
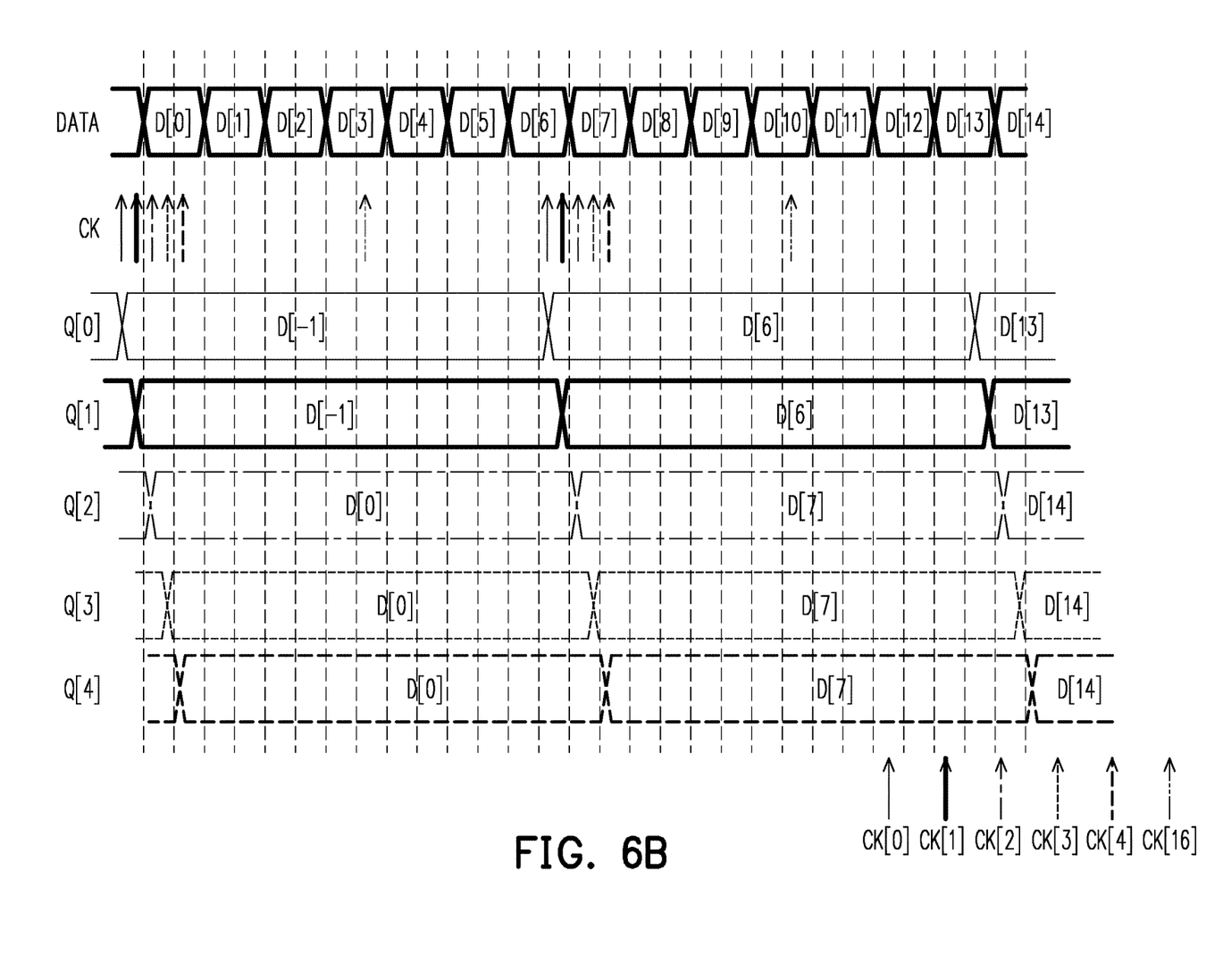

Referring to FIGS. 6A and 6B, FIGS. 6A and 6B illustrate operation waveform diagrams of the clock data calibration circuit when phases of the clock signals pull ahead according to an embodiment of the invention. In FIG. 6A, the first sampled data Q[0], Q[1], Q[2], Q[3] and Q[4] obtained by respectively sampling according to the clock signals CK[0]-CK[4] may be as shown in FIG. 6A. When the phases of the clock signals pull ahead the data signal by 0-0.25 UI, and when data D[6] and D[7] in the data signal DATA are the same, the first sampled data Q[0], Q[1], Q[2], Q[3] and Q[4] (i.e., the second sampled data RQ[0], RQ[1], RQ[2], RQ[3] and RQ[4]) obtained by sampling the data signal DATA according to a second sampling point of the clock signal CK[16] are respectively data D[6], D[7], D[7], D[7] and D[7], which may all be logic 1 or logic 0. Under such condition, according to the variation state of the second sampled data, the status flags S[2], S[1], S[0] generated by the data comparators of the embodiment of the invention may be respectively logic 1, 1, and 1. Further, the data selector may select the first sampled data Q[2] located in the middle (equal to the second sampled data RQ[2]) as an output data signal according to the status flags S[2], S[1], S[0] equal to logic 1, 1, 1 with reference of Table 2.

Based on the above description, when the data D[6] and D[7] in the data signal DATA are not the same, the first sampled data Q[0], Q[1], Q[2], Q[3] and Q[4] (i.e., the second sampled data RQ[0], RQ[1], RQ[2], RQ[3] and RQ[4]) obtained by sampling the data signal DATA according to the second sampling point of the clock signal CK[16] are respectively data D[6], D[7], D[7], D[7] and D[6], which may be logic 0,1,1,1,1 or logic 1,0,0,0,0. Under such condition, according to the variation state of the second sampled data, the status flags S[2], S[1], S[0] generated by the data comparators of the embodiment of the invention may be respectively logic 1, 0, 0. Further, the data selector may select the first sampled data Q[2] (equal to the second sampled data RQ[2]) as an output data signal according to the status flags S[2], S[1], S[0] equal to logic 1, 0, 0 with reference of Table 2.

In the embodiment of FIG. 6A, when the data D[6] and D[7] are the same, the selected output data signal (the first sampled data Q[2]) may satisfy a setup time greater than 1.25 UI, and has a hold time greater than 0.5 UI. When the data D[6] and D[7] are not the same, the selected output data signal (the first sampled data Q[2]) may satisfy the setup time greater than 0.25 UI and has the hold time greater than 0.5 UI.

In FIG. 6B, the first sampled data Q[0], Q[1], Q[2], Q[3] and Q[4] obtained by respectively sampling according to the clock signals CK[0]-CK[4] may be as shown in FIG. 6B. When the phases of the clock signals pull ahead the data signal by 0.25-0.5 UI, and when the data D[6] and D[7] in the data signal DATA are the same, the first sampled data Q[0], Q[1], Q[2], Q[3] and Q[4] (i.e., the second sampled data RQ[0], RQ[1], RQ[2], RQ[3] and RQ[4]) obtained by sampling the data signal DATA according to the second sampling point of the clock signal CK[16] are respectively data D[6], D[6], D[7], D[7] and D[7], which may all be logic 1 or logic 0. Under such condition, according to the variation state of the second sampled data, the status flags S[2], S[1], S[0] generated by the data comparators of the embodiment of the invention may be respectively logic 1, 1, and 1. Further, the data selector may select the first sampled data Q[2] located in the middle (equal to the second sampled data RQ[2]) as an output data signal according to the status flags S[2], S[1], S[0] equal to logic 1, 1, 1 with reference of Table 2.

Based on the above description, when the data D[6] and D[7] in the data signal DATA are not the same, the first sampled data Q[0], Q[1], Q[2], Q[3] and Q[4] (i.e., the second sampled data RQ[0], RQ[1], RQ[2], RQ[3] and RQ[4]) obtained by sampling the data signal DATA according to the second sampling point of the clock signal CK[16] are respectively data D[6], D[6], D[7], D[7] and D[7], which may be logic 0,0,1,1,1 or logic 1,1,0,0,0. Under such condition, according to the variation state of the second sampled data, the status flags S[2], S[1], S[0] generated by the data comparators of the embodiment of the invention may be respectively logic 1, 0, 0. Further, the data selector may select the first sampled data Q[3] (equal to the second sampled data RQ[3]) as an output data signal according to the status flags S[2], S[1], S[0] equal to logic 1, 0, 0 with reference of Table 2.

In the embodiment of FIG. 6B, when the data D[6] and D[7] are the same, the selected output data signal (the first sampled data Q[2]) may satisfy a setup time greater than 1.0 UI, and has a hold time greater than 0.75 UI. When the data D[6] and D[7] are not the same, the selected output data signal (the first sampled data Q[3]) may satisfy the setup time greater than 0.25 UI and has the hold time greater than 0.5 UI.

Figure 7:
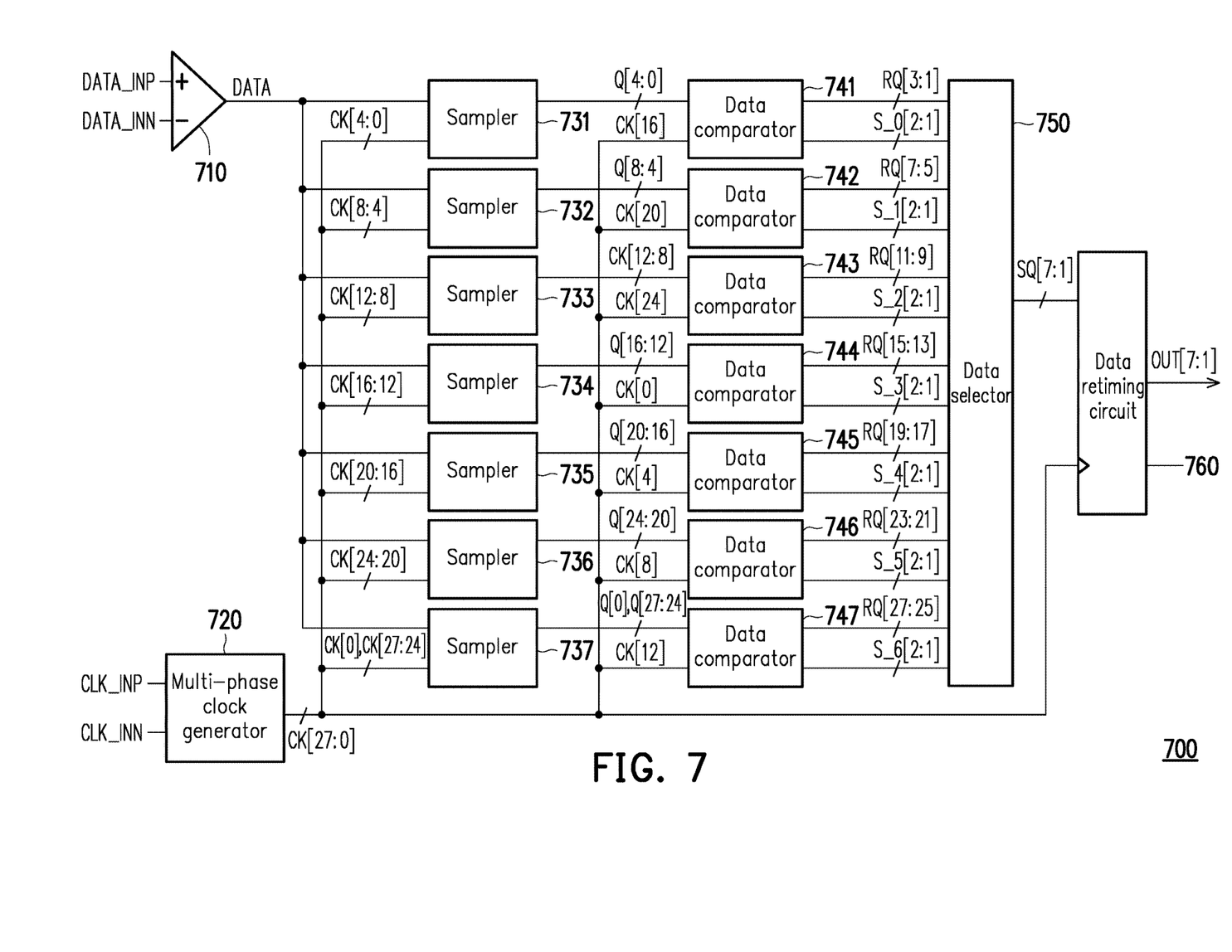
FIG. 7 is a schematic diagram of a clock data calibration circuit according to another embodiment of the invention.

Referring to FIG. 7, FIG. 7 is a schematic diagram of a clock data calibration circuit according to another embodiment of the invention. A clock data calibration circuit 700 includes a comparator 710, a multi-phase clock generator 720, samplers 731-737, data comparators 741-747, a data selector 750, and a data retiming circuit 760. Different from the embodiment of FIG. 1, the clock data calibration circuit 700 further includes the data retiming circuit 760. The data retiming circuit 760 is coupled to an output terminal of the data selector 750. The data retiming circuit 760 receives an output data signal SQ[7:1] generated by the data selector 750, and receives one of a plurality of clock signals CK[27:0]. The data retiming circuit 760 retimes the output data signal SQ[7:1] according to the received clock signals to generate a plurality of retimed output data signals OUT[7:1]. The data retiming circuit 760 may be implemented by a plurality of flip-flops. In the embodiment, the data retiming circuit 760 may choose to receive the clock signal CK[16] or CK[0] as a reference for retiming.

Figure 8:
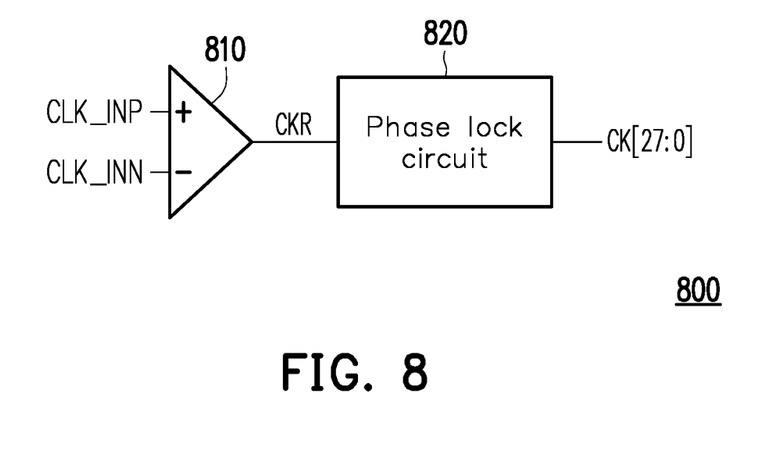
FIG. 8 is a schematic diagram of an implementation of a multi-phase clock generator in a clock data calibration circuit according to an embodiment of the invention.

Referring to FIG. 8, FIG. 8 is a schematic diagram of an implementation of a multi-phase clock generator in a clock data calibration circuit according to an embodiment of the invention. The multi-phase clock generator 800 includes a comparator 810 and a phase lock circuit 820. The comparator 810 compares the input clock CLK_INP and the input clock CLK_INN to generate a reference clock CKR. The phase lock circuit 820 receives the reference clock CKR, and performs a phase lock operation on the reference clock CKR to generate a plurality of clock signals CK[27:0] with different phases.

In detail, the comparator 810 may be implemented by an operational amplifier, where a positive input terminal of the operational amplifier receives the input clock CLK_INP, and a negative input terminal of the operational amplifier may receive the input clock CLK_INN. An output terminal of the operational amplifier may generate a reference clock CKR. The phase lock circuit 820 may be a phase lock loop or a delay lock loop. Those with ordinary knowledge in the art may apply any well-known phase lock loop circuit or delay lock loop circuit to implement the phase lock circuit 820 without any restriction.

In summary, the invention uses clock signals with a plurality of different phases to sample the data signal, and selects one of the plurality of sampled data as a suitable output data signal by determining variation states of the successive plurality of sampled data. In this way, the selected output data signal may have a sufficiently long hold time and setup time, which may improve the skew tolerance between clock and data, and enhance data reliability.

What is claimed is:

1. A clock data calibration circuit, comprising:
   a first comparator comparing first input data with second input data to generate a data signal;
   a multi-phase clock generator comparing a first input clock and a second input clock to generate a plurality of clock signals with different phases, wherein the plurality of clock signals are divided into a plurality of clock groups;
   a plurality of samplers sampling the data signal according to the plurality of clock groups to, respectively generate a plurality of first sampled data signal groups, wherein each of the plurality of samplers samples the data signal according to one of the plurality of clock groups to generate a corresponding first sampled data signal group;
   a plurality of data comparators, respectively sampling the plurality of first sampled data signal groups according to a plurality of selected clocks in the plurality of clock signals to, respectively, generate a plurality of second sampled data signal groups, wherein each of the data comparators generates a plurality of status flags according to a variation state of a plurality of second sampled data of each of the second sampled data signal groups, wherein each of the plurality of data comparators samples one of the first sampled data signal groups according to one of the plurality of selected clocks; and
   a data selector selecting the second sampled data according to the plurality of status flags to generate a plurality of output data signals.

2. The clock data calibration circuit as claimed in claim 1, wherein an X-th data comparator samples a 4X-th first sampled data to a (4X+4)-th first sampled data according to a (4X+16)-th clock signal to respectively generate a 4X-th second sampled data to a (4X+4)-th second sampled data, wherein X is an integer not less than 0.

3. The clock data calibration circuit as claimed in claim 2, wherein the X-th data comparator further generates a first status flag according to a variation state of the 4X-th second sampled data to the (4X+2)-th second sampled data, generates a second status flag according to a variation state of the (4X+1)-th second sampled data to the (4X+3)-th second sampled data, and generates a third status flag according to a variation state of the (4X+2)-th second sampled data to the (4X+4)-th second sampled data.

4. The clock data calibration circuit as claimed in claim 3, wherein the X-th data comparator comprises:
   a plurality of flip-flops, respectively receiving the 4X-th first sampled data to the (4X+4)-th first sampled data, and sampling the 4X-th first sampled data to the (4X+4)-th first sampled data according to the (4X+16)-th clock signal to respectively generate the 4X-th second sampled data to the (4X+4)-th second sampled data; and
   a logic circuit comparing the 4X-th second sampled data to the (4X+2)-th second sampled data to generate the first status flag, comparing the (4X+1)-th second sampled data to the (4X+3)-th second sampled data to generate the second status flag, and comparing the (4X+2)-th second sampled data to the (4X+4)-th second sampled data to generate the third status flag.

5. The clock data calibration circuit as claimed in claim 1, wherein the plurality of status flags corresponding to each of the data comparators comprises a first status flag, a second status flag and a third status flag, corresponding to an X-th data comparator, when the plurality of first status flags of the plurality of status flags are the same, the plurality of second status flags of the plurality of status flags are the same, and the plurality of third status flags of the plurality of status flags are the same, the data selector respectively generates a plurality of selection signals according to the plurality of third status flags, and selects the second sampled data according to the plurality of selection signals to generate the plurality of output data signals.

6. The clock data calibration circuit as claimed in claim 5, wherein the data selector comprises:
   a first logic gate performing an XNOR logic operation on the plurality of first status flags to generate a first operation value;
   a second logic gate performing the XNOR logic operation on the plurality of second status flags to generate a second operation value;
   a third logic gate performing the XNOR logic operation on the plurality of third status flags to generate a third operation value;
   a fourth logic gate performing an AND operation on the first operation value, the second operation value, and the third operation value to generate a fourth operation value; and
   a plurality of gate controllers passing one of the plurality of first status flags, one of the plurality of second status flags, and one of the plurality of third status flags according to the fourth operation value to respectively generate the plurality of selection signals.

7. The clock data calibration circuit as claimed in claim 6, wherein corresponding to the X-th data comparator, the data selector further comprises:
   a multiplexer selecting one of the (4X+1)-th second sampled data to the (4X+3)-th second sampled data according to the plurality of selection signals to generate an (X+1)-th output data signal.

8. The clock data calibration circuit as claimed in claim 1, wherein the multi-phase clock generator comprises:
   a second comparator comparing the first input clock and the second input clock to generate a reference clock; and
   a phase lock circuit performing a phase lock operation on the reference clock to generate the plurality of clock signals.

9. The clock data calibration circuit as claimed in claim 8, wherein the phase lock circuit is a delay lock loop or a phase lock loop.

10. The clock data calibration circuit as claimed in claim 1, further comprising:
    a data retiming circuit retiming the output data signals according to one of the plurality of clock signals to generate a plurality of retimed output data signals.

* * * * *